United States Patent
Droese et al.

(10) Patent No.: US 6,612,204 B1
(45) Date of Patent: Sep. 2, 2003

(54) PROCESS FOR MANUFACTURING A BLADE OF A CUTTING TOOL AND PRODUCT MANUFACTURED THEREWITH

(75) Inventors: Joachim Droese, Langenfeld (DE); Horst Gräfe, Wuppertal (DE)

(73) Assignee: Zwilling J.A. Henckels Atiengesellschaft, Solingen (DE)

( * ) Notice: Subject to any disclaimer, the term of this patent is extended or adjusted under 35 U.S.C. 154(b) by 0 days.

(21) Appl. No.: 09/612,231

(22) Filed: Jul. 7, 2000

(30) Foreign Application Priority Data

Jul. 9, 1999 (DE) .......................... 199 31 948

(51) Int. Cl.$^7$ .......................... B21K 11/02; B23P 15/28
(52) U.S. Cl. ................. 76/104.1; 148/512; 219/121.66; 219/121.85
(58) Field of Search ............................ 76/101.1, 104.1; 30/350, 357; 219/121.85, 121.66; 148/512

(56) References Cited

U.S. PATENT DOCUMENTS

| | | | | |
|---|---|---|---|---|
| 4,323,756 A | * | 4/1982 | Brown et al. | 219/121.66 |
| 4,488,882 A | | 12/1984 | Dausinger | 51/295 |
| 4,755,237 A | * | 7/1988 | Lemelson | 128/152 |
| 5,181,321 A | * | 1/1993 | Gouttebarge | 76/104.1 |
| 5,429,016 A | * | 7/1995 | Rowlett | 76/115 |
| 5,724,868 A | | 3/1998 | Knudsen et al. | 76/104.1 |
| 5,906,053 A | | 5/1999 | Turner | 30/347 |

FOREIGN PATENT DOCUMENTS

| | | |
|---|---|---|
| DE | 4106227 | 11/1991 |
| DE | 4120689 | 4/1992 |
| DE | 4334409 | 4/1995 |
| DE | 4409746 | 11/1995 |
| DE | 19508947 | 9/1996 |
| DE | 19650258 | 6/1998 |
| EP | 0191203 | 8/1986 |
| GB | 2160227 | 12/1985 |

OTHER PUBLICATIONS

Patent abstracts of Japan, vol. 17, No. 361 Jul. 8, 1993, 05–051628, Mar. 2, 1993.

* cited by examiner

Primary Examiner—Hwei-Siu Payer
(74) Attorney, Agent, or Firm—Smith, Gambrell & Russell LLP

(57) ABSTRACT

A method for manufacturing a blade of a cutting tool, in particular, a knife. In order to create a process with which influence is to be exerted in a targeted manner on the technological material properties of the blade and material chipping to be avoided, as well as permitting economical manufacturing, a process is carried out by treating a blade base material with a laser in a first process step along a curve contour determined by the final edge of the blade and, in a second process step, the edge of the blade is formed, in particular, cut to shape, along the curve contour determined by the final blade form inside the laser-treated area, or the blade base material is machined in a first process step by punching or trimming to form the final edge, subsequently the laser treatment is performed in a second process step on the narrow side forming the final edge and finally, in a third process step, the blade is formed, in particular, ground, inside the laser-treated area.

19 Claims, 2 Drawing Sheets

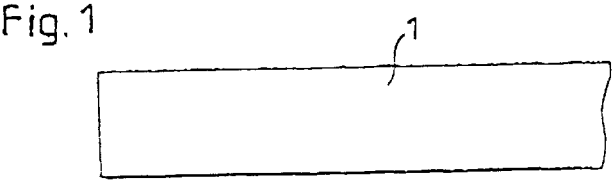
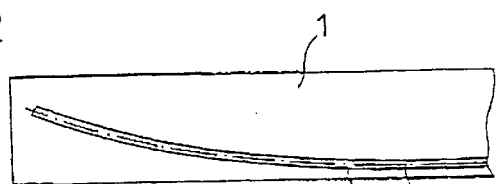
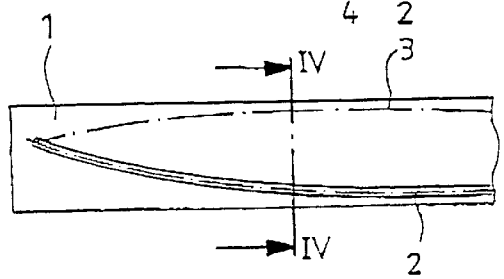
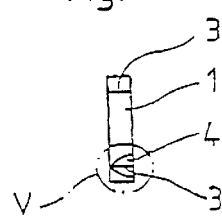
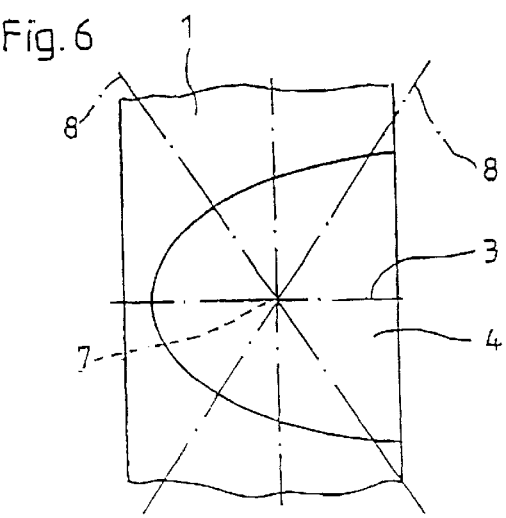
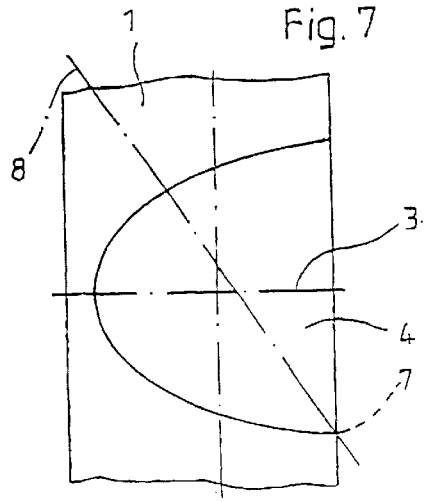
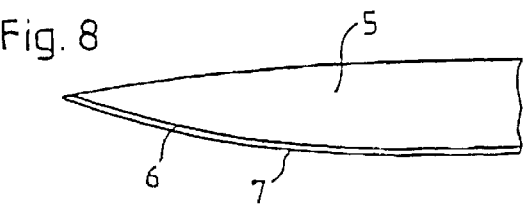

PROCESS FOR MANUFACTURING A BLADE OF A CUTTING TOOL AND PRODUCT MANUFACTURED THEREWITH

INTRODUCTION AND BACKGROUND

The present invention pertains to a process for manufacturing a blade of a cutting tool, in particular, a knife. In a further aspect, the invention additionally pertains to a blade manufactured according to the process.

Processes of manufacturing a blade of a cutting tool are known from the prior art. First of all, starting from a precursor material present in the form of a flat material, a blade blank whose geometric dimensions approximately correspond to those of the ultimate finished blade form is produced by punching. The machining of the precursor material can be accomplished by, for instance, processes of punching technology, pressure forming, bending forming or shearing forming. The cutting of a blade blank to size is also known from the prior art. In a second manufacturing stage, the fine machining of the blade blank then takes place. The appropriate blade contour on the one hand and the edge area on the other are formed, the appropriate grinding agents being used for this. In the third manufacturing stage, finally, the boundary layer of the blade material in the edge area is hardened, for which the blade is subjected to a heat treatment process and the boundary layer can be enriched with an additive material such as tungsten, chromium or titanium. In particular, nitriding, wherein the chemical composition of the boundary layer is modified in that nitrogen in atomic form is diffused into the material surface, is employed as the thermomechanical diffusion treatment process. In order to form hard, chemically and thermally very resistant nitrides, alloying elements having an affinity for nitrogen can be added. Finally, following the boundary layer hardening, the extra machining of the blades and particularly edge area by, for instance, grinding, is necessary in a fourth stage.

According to previously known manufacturing processes, there is generally a through-hardening or a boundary layer hardening with a hardening depth of <0.2 mm, which, in conjunction with an embrittlement, results in chipping of the hard boundary layer. Thus, the formation of such a boundary layer has proven to be disadvantageous, in particular in the manufacturing of a knife blade, since use of the knife together with a hard cutting substrate of, for instance, glass or ceramic can lead to localized chipping of the boundary layer. As the result of the chipping of the hardened boundary layer, the edge area of the blade is destroyed, and as a result the knife becomes unsuitable for the intended use. A shock-like stress on the blade, for instance, when it is dropped from a certain height and impacts on a hard surface, can disadvantageously lead to a chipping of the hardened boundary layer.

Previously known processes of manufacturing a blade additionally have the disadvantage that they are in some instances quite elaborate and thus cost-intensive because, depending on the process used to harden the boundary layer, subsequent machining by means of, for instance, grinding is necessary. Another consequence of this is that automation of the previously employed processes can be produced only with difficulty.

It is therefore an object of the present invention to create a process for manufacturing a cutting tool, avoiding the above-cited disadvantages, whereby the technological material properties of the blade can be specifically influenced and material chipping can be avoided, as well as enable an economical production thereof.

SUMMARY OF THE INVENTION

The above and other objects of the present invention can be achieved by a process wherein the blade base material is laser-treated in a first process step along a curve contour determined by the ultimate edge of the blade and, in a second process step, the edge of the blade is formed, in particular, cut to shape, inside the laser-treated area along the curve contour defined by the ultimate blade shape, or the blade base material is machined to form the ultimate blade in a first process step by punching or trimming, then, in a second process step, the laser treatment is performed on the narrow side forming the ultimate edge and finally the edge is formed, in particular, ground inside the laser-treated area in a third process step.

Advantageously, the laser treatment of the blade base material results in a chemical enhancement of the material in the surface area, alongside the thermally-induced improvement of the material properties. A thermochemical influence on the base material is also achieved by the employment of the laser, with which an ultrafine grain texture of high strength with good toughness at the same time can be attained. The material modification takes place at a temperature above the melt-fluid phase of the substrate material, the upper limit value for the heating of the material being given by the evaporation temperature. After the melting of the base material, additive materials are added into the melt-fluid phase and mixed with it for targeted modification of the material. Advantageously, not only a hardening of the base material is achieved thereby, but also an enhancement of the properties of the material, which is distinguished by an improvement of wear resistance alongside an increase in hardness.

According to a first alternative, the process according to the invention advantageously provides that the laser treatment be performed before formation of the final edge. The laser treatment in this case takes place along the curve contour defined by the ultimate edge of the blade. Only in a second process step does the final machining of the blade then take place. Thus there can be a targeted influence on the material properties both by the selection of the materials used and by mutually adapted and coordinated process steps.

According to a second alternative, the process according to the invention is carried out by performing the laser treatment on the narrow side of the blade constituting the ultimate edge. To this end, the blade base material is machined in a first process step by punching or trimming to form the ultimate edge. Subsequently, the laser treatment is performed in a second process step on the narrow side constituting the ultimate edge. In a third process step, finally, the edge is formed, in particular, ground inside the laser-treated area. The laser treatment on the narrow side of the blade constituting the later edge permits a targeted influencing of the material properties of the blade base material in a direction lying perpendicular to the longitudinal direction of the ultimate edge. Depending on the materials or material components used, high-quality material areas can thus be created that correspond to the ultimate edge area and meet the demands placed on the material areas.

Depending on the means by which the additive material is to be fed to the zone melted by the laser beam, it is possible to distinguish between a one-stage and a two-stage process. In the two-stage laser treatment, the first work step consists in applying the additive material to the base material, the material application taking place along a curve contour defined by the ultimate edge of the blade. In the subsequent second process step, the fturther treatment of the applied cover layer by the laser beam then takes place. In the one-stage laser surface treatment, on the other hand, the additive material is applied directly to the zone melted by the laser beam.

With the method of the invention, therefore, not only is hardening in the edge area produced, but a material modification over the entire width, the entire length and the entire depth of the edge is achieved by the melting of the base material and the supply of the additive material. Chipping of the boundary layer in the edge area can thus be avoided, even when a hard edge substrate is used.

Both the process step of laser treatment and the process step of cutting the blade to size can advantageously be automated and performed one immediately following the other. Here, the laser treatment according to the one-step process, in particular, has proven to be more flexibly utilizable.

According to a feature of the present invention, a finishing of the knife, in particular the knife edge, occurs in a third process step following the first two process steps.

According to a further feature of the present invention, the laser treatment is accomplished by way of laser beam alloying. Laser beam alloying permits the production of high-quality alloy areas by the inclusion of suitable additives. As a thermomechanically acting laser treatment, the additives go completely into solution during alloying and are held in solution by the rapid cooling. By laser beam alloying, a composite material having a higher wear resistance than a quenching and tempering structure, because of its high degree of alloying and the structure produced by the rapid solidification, is created in the area of the active allowing effects. A clear increase of hardness is also advantageously attained.

According to an additional feature of the present invention, the laser treatment is done by means of laser beam dispersion. In this alternative laser treatment, as in laser beam alloying as well, higher-melting additive materials are brought into the base material melt which is produced by the laser. In contrast to alloying, however, an embedding of the solid additive material in the melted substrate takes place, wherein it is desired to keep the additive materials introduced into the melt in their original form as much as possible. As with laser beam alloying, a higher wear resistance is attained with laser dispersion.

In a further feature of the present invention a member selected from the consisting of chromium, tungsten, molybdenum, titanium, vanadium, tantalum, nickel, cobalt, manganese and combinations thereof is used for the production of high-quality material areas by laser beam alloying or dispersion. Targeted influence on the material characteristics can be exerted by the selection of appropriate additive materials.

Yet another feature of the present invention, involves using high-melting carbides, nitrides and/or oxides as additive materials. The use of these additive materials is advantageous particularly in conjunction with the application of laser beam dispersion, wherein the high-melting additive materials are worked into the ductile matrix of a low-melting base material and thus form areas with markedly elevated hardness properties.

According to another feature of the present invention, the additive materials are fed directly in wire, gas, powder and/or paste form to the zone of the base material melted by the laser beam. By comparison to the two-step process, in which the additive material is first applied to the surface of the base material and only later melted into it in the second process step, the one-stage process permits the simultaneous feeding of the additive material, with greater variation possibilities being created thereby. Particularly the supplying of the additive material in gas, powder and/or paste opens a number of widely varying design possibilities.

In accordance with another feature of the invention, the blade base material is subjected to a subsequent heat treatment after the laser surface treatment has taken place. The provision of a heat treatment is particularly advantageous after laser beam alloying has taken place, since laser beam alloying produces a composite material that shows a higher wear resistance in the alloy area, both because of its higher degree of alloying and because of the structural state brought about by the rapid solidification. As a consequence of transformation and precipitation processes, a marked increase in hardness can be achieved by a heat treatment following the laser beam alloying.

Still another feature of the present invention, involves the shaping of the blades by means of lasers. Cutting to size by means of lasers permits, on the one hand, an exact and precisely specifiable cutting line and, on the other hand, the area previously laser-treated in the first process step is not damaged thereby.

A still further feature of this invention relates to cutting the laser-treated area to shape corresponding to the later edge shape. Differently from the processes known from prior art, it is thus proposed not only to produce the blade form as such by cutting to size with lasers, but to form the edge shape simultaneously with the cutting to shape of the blade. To form any special details, post-machining by means of, for instance, grinding of the blade and especially the edge can take place.

A blade produced according to the process of the invention has a mechanical and chemical enhancement in the laser-treated area by comparison to the untreated base material. In this way, not only is an increased hardness over and against the base material achieved, but also, in comparison to conventionally quenched and tempered materials, it the invention also creates the possibility of exerting targeted influence on the material characteristics by the inclusion of suitable additive materials and varying them in regard to corrosion resistance and wear resistance according to the application case.

Finally, a further feature of this invention provides the laser-treated area with a high degree of intermixing between base material and additive material. This high degree of intermixing is the result of an intensive mixing of the liquid melted base material and the respective additive material. This advantageously creates an area that has constant properties over its entire extent, which prevents an area-specific chipping of the surface-treated area.

BRIEF DESCRIPTION OF THE DRAWINGS

Additional details and advantages of the invention result from the description below taken with the accompanying drawings, wherein:

FIG. 1 is a partial a side view of the starting material before the first process step according to the first alternative of the process of the invention;

FIG. 2 is a partial a side view of the starting material after completion of the first process step and before the start of the second process step according to the first alternative of the process of the invention;

FIG. 3 is a partial side view according to FIG. 2, including the curve contour of the ultimate blade shape;

FIG. 4 is a sectional representation along the section line IV—IV of FIG. 3;

FIG. 6 is an alternative configuration according to FIG. 5;

FIG. 7 is an alternative configuration according to FIG. 5;

FIG. 8 is a partial side view of the finished blade after completion of the second process step;

DETAILED DESCRIPTION OF INVENTION

Figure 5:
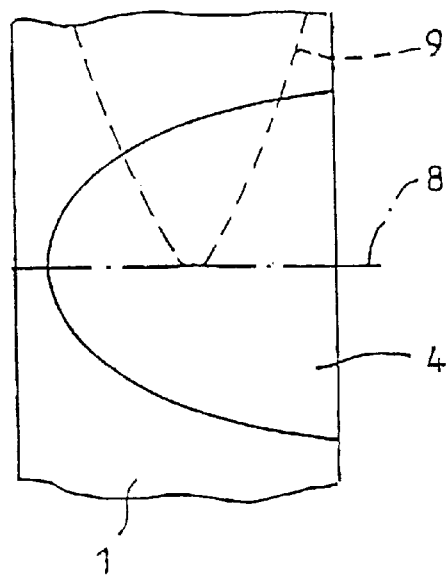
FIG. 5 is an enlarged representation of the area V of FIG. 4.

The present invention will now be discussed in detail with reference to the drawings.

In FIG. 1, the initial workpiece labeled 1, from which the blade 5 of a cutting tool, in particular, a knife, is manufactured according to the process of the invention, is schematically shown. The initial workpiece 1 has a defined length, width and height and preferably consists of an alloyed steel such as X 20 Cr 13. Other suitable metals can be used as will be apparent to those skilled in the art.

In the first process step, a laser treatment of the blade base material is performed along the curve contour 2 determined by the ultimate edge of the blade. This is shown in FIG. 2. In particular, laser beam alloying and laser beam dispersion are suitable laser treatment processes. Both processes permit the targeted influencing of material properties by melting the base material and including suitable additive materials such as chromium, tungsten, molybdenum, titanium, vanadium, tantalum, nickel, cobalt or manganese. In the alloying process, these materials go completely into solution and are largely held in solution even after the cooling because of the rapid solidification. In dispersion, by contrast, the additive materials introduced into the melt are preserved in their original form as much as possible and embedded in the melted substrate as high-melting mechanically resistant materials. By such a laser treatment, firstly, a marked increase in hardness over and against the base material is achieved and, secondly, an improvement of the wear resistance over and against conventional processes is also achieved.

A laser-treated surface area 4 along a curve contour 2 determined by the ultimate edge can be formed, taking on a melt track value from 0.6 to 6.0 mm for ordinary commercial lasers, depending on the steel material used. Melting depths of >1.0 mm are usually achieved.

FIG. 3 shows a laser-treated starting workpiece 1 according to FIG. 2, with the curve contour of the ultimate edge shape or contour 3 also being represented. In the area where the laser treatment occurs, the curve contour 2 of the ultimate edge and the curve contour 3 of the ultimate blade shape coincide.

A section across the longitudinal direction of the workpiece 1 is shown in FIG. 4. Recognizable here is the schematically indicated course of the curve contour 3 as well as the area 4 formed in the lower area of the workpiece 1 due to laser treatment. An enlargement of this area is shown in FIG. 5.

Following the laser surface treatment the forming of the blade takes along a curve contour 3 defined by the final blade shape takes place in a second process step. This is done according to a proposal of the invention by means of lasers. This is shown in enlarged representation in FIG. 5. To form the blade it is first cut out along the section line profile 8 by means of laser. As FIG. 5 clearly shows, the cutting (or section) line profile 8 coincides exactly with the curve contour 2 inside the laser-treated area of the initial workpiece 1. After the cutting to shape of the blade is finished, the edge is formed by forming the edge flanks. This is preferably done by means of appropriate grinding means. A possible edge flank profile 9 is shown for the sake of example in FIG. 5. It can also be seen from FIG. 5 that the later edge flank not only has an area that has experienced a hardening from the laser treatment, but that the cutting edge shows a material modification produced by the laser treatment over its entire width, length and depth (see FIG. 3) whereby an area-wide chipping of material is prevented.

A configuration form which is an alternative in comparison to FIG. 5 is shown in FIG. 6. It is recognizable here that the cutting courses indicated by the section lines 8 cut through the laser surface-treated area such that an edge is formed. The cutting to shape of the blade is thus done with a simultaneous formation of the edge flanks whose ultimate facet 7 is arranged centrally in the surface-treated area 4 and whose edge flanks that are denoted by section lines 8 are at an angle of <90° to one another.

FIG. 7 shows an additional alternative configuration form in which the later formed facet 7 is not arranged centrally but at the boundary of the laser surface-treated area 4 and the two later edge flanks of the edge are formed, on the one hand, by the body edge of the workpiece 1 and, on the other, by the section line 8.

FIG. 8 shows a blade 5 produced by this method with an edge area 6 optionally formed by post-machining and a facet 7.

Figure 9:
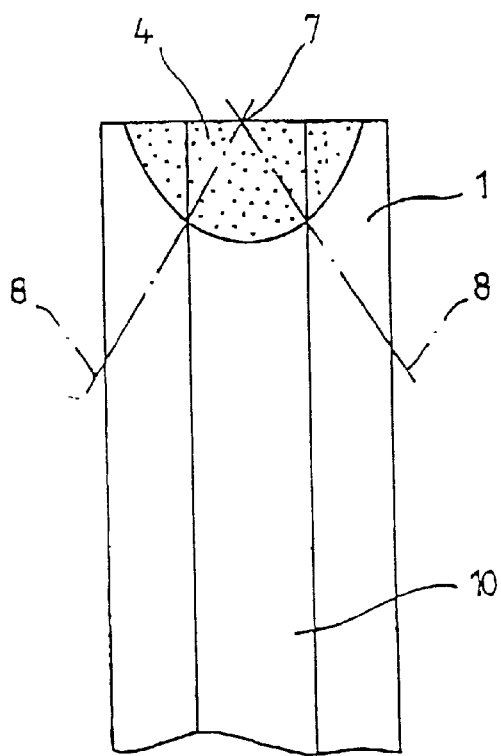
FIG. 9 is a partial sectional view of the initial workpiece along a section line across the edge after laser treatment according to the second alternative of the process of the invention has taken place.
Figure 10:
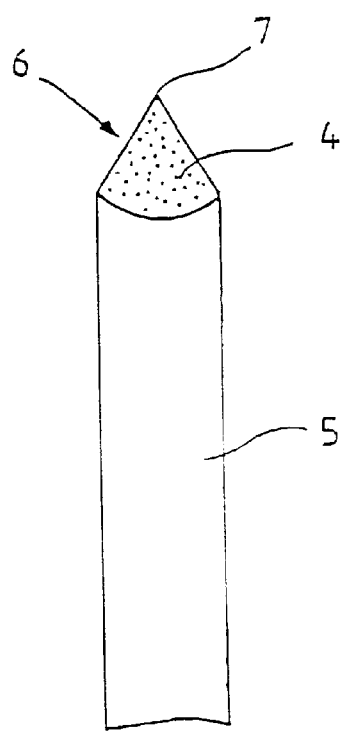
FIG. 10 is a partial a sectional representation of a finished blade according to FIG. 9.

In FIGS. 9 and 10, the manufacturing of a blade is shown in which the laser treatment is conducted on the narrow side forming the ultimate or final edge. First of all, the initial workpiece 1 is machined in a first work step by punching or trimming to form the final edge. Subsequently, the laser treatment of the narrow side forming the final edge follows in a second process step. A sectional representation of the initial workpiece 1 after finished laser treatment is shown in FIG. 9. The laser-treated area 4 is recognizable on the narrow side of the initial workpiece 1. Following the laser treatment, the formation of the edge inside the laser-treated area 4 takes place in a third process step. In FIG. 9, the edge flank profile of the final blade 10 is shown with the section lines 8, with the facet 7 defined by way of the intersection of the two lines 8 at an angle of <90° to one another. Even in the final blade shown in FIG. 9, an edge flank is formed that has a material modification produced by laser treatment not only in boundary areas, but over its entire length, width and depth, which prevents an area-wide chipping even when hard edge substrates are used.

FIG. 10 shows a final blade 5 produced according to the process of the invention with an edge area 6 and a facet 7. As the figure clearly shows the laser-treated area having modified properties in comparison to the base material extends over the entire edge area.

Further variations and modifications of the foregoing will be apparent to those skilled in the art and are intended to be encompassed by the claims appended hereto.

We claim:

1. A method for manufacturing a finished blade of a cutting tool, having a cutting edge, comprising:

(a) treating a blade base material with a laser in a first process step along a curve contour determined by said cutting edge of said finished blade to form a laser treated area and, in a second process step, forming the blade base material to a desired shape with said cutting edge inside said laser-treated area, or (b) machining said blade base material in a first process step by punching or trimming the blade base material to a desired shape having said cutting edge, subsequently in a second process step, laser treating the cutting edge of the finished blade, and in a third process step, shaping the laser treated cutting edge, whereby the laser treatment is by laser beam dispersion or laser beam alloying and whereby the laser beam dispersion or laser beam alloying is carried out with a material selected from the group consisting of chromium, tungsten, molybdenum, titanium, vanadium, tantalum, nickel, cobalt, manganese, and combinations thereof.

2. The method according to claim 1 wherein said cutting tool is a knife.

3. The method according to claim 2, the laser treatment is laser beam remelting with rapid cooling to achieve a fine-grained structure and avoid carbide formation.

4. The method according to claim 1 wherein said forming or machining is performed by cutting said blade base material.

5. The method according to claim 4, the laser treatment is laser beam remelting with rapid cooling to achieve a fine-grained structure and avoid carbide formation.

6. The method according to claim 1 wherein said forming in the third process step is by grinding.

7. The method according to claim 6, the laser treatment is laser beam remelting with rapid cooling to achieve a fine-grained structure and avoid carbide formation.

8. The method according to claim 1, the laser treatment is laser beam remelting with rapid cooling to achieve a fine-grained structure and avoid carbide formation.

9. The method according to claim 1, wherein the laser treatment penetrates to a thickness of 1 to 6 mm of said blade base material.

10. The method according to claim 1, further comprising adding a high-melting carbide, nitride and/or oxide as an additive material.

11. The method according to claim 1 wherein an additive material is supplied directly to a zone of the blade base material melted by the laser in wire, gas, powder and/or paste form.

12. The method according to claim 1, wherein the blade base material is subjected to a subsequent heat treatment after the laser surface treatment has been performed.

13. The method according to claim 1, wherein the shape of the blade is cut out by means of lasers.

14. The process according to claim 1, wherein the laser-treated area is centrally cut or ground.

15. A blade, manufactured according to the process of claim 1, characterized in that said blade base material is corrosion-resistant and has a mechanical and chemical enhancement in the laser treated cutting edge in comparison to an untreated blade base material.

16. The blade according to claim 11, characterized in that the laser-treated cutting edge has a high degree of intermixing between said blade base material and said additive material as a result of an application of said additive material to said blade base material while said blade base material is in a melted liquid state.

17. A method for manufacturing a finished blade of a cutting tool, having a cutting edge, comprising:

(a) treating a blade base material with a laser in a first process step along a curve contour determined by said cutting edge of said finished blade to form a laser treated area and, in a second process step, forming the blade base material to a desired shape with said cutting edge inside said laser-treated area, or (b) machining said blade base material in a first process step by punching or trimming the blade base material to a desired shape having said cutting edge, subsequently in a second process step, laser treating the cutting edge of the finished blade, and in a third process step, shaping the laser treated cutting edge, further comprising adding a high-melting carbide, nitride and/or oxide as an additive material.

18. A method for manufacturing a finished blade of a cutting tool, having a cutting edge, comprising:

(a) treating a blade base material with a laser in a first process step along a curve contour determined by said cutting edge of said finished blade to form a laser treated area and, in a second process step, forming the blade base material to a desired shape with said cutting edge inside said laser-treated area, or (b) machining said blade base material in a first process step by punching or trimming the blade base material to a desired shape having said cutting edge, subsequently in a second process step, laser treating the cutting edge of the finished blade, and in a third process step, shaping the laser treated cutting edge, wherein the blade base material is subjected to a subsequent heat treatment after the laser surface treatment has been performed.

19. A method for manufacturing a finished blade of a cutting tool, having a cutting edge, comprising:

(a) treating a blade base material with a laser in a first process step along a curve contour determined by said cutting edge of said finished blade to form a laser treated area and, in a second process step, forming the blade base material to a desired shape with said cutting edge inside said laser-treated area, or (b) machining said blade base material in a first process step by punching or trimming the blade base material to a desired shape having said cutting edge, subsequently in a second process step, laser treating the cutting edge of the finished blade, and in a third process step, shaping the laser treated cutting edge, characterized in that said blade base material is corrosion-resistant and has a mechanical and chemical enhancement in the laser treated cutting edge in comparison to an untreated blade base material, and characterized in that the laser-treated cutting edge has a high degree of intermixing between said blade base material and an additive material as a result of an application of said additive material to said blade base material while said blade base material is in a melted liquid state.

* * * * *